United States Patent
Holtmanns et al.

(10) Patent No.: US 8,560,015 B2
(45) Date of Patent: Oct. 15, 2013

(54) APPLICATION SELECTION FOR MULTI-SIM ENVIRONMENT

(75) Inventors: Silke Holtmanns, Klaukkala (FI); Pekka Johannes Laitinen, Helsinki (FI); Rune Lindholm, Sottunga (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/544,178

(22) Filed: Jul. 9, 2012

(65) Prior Publication Data

US 2013/0023309 A1 Jan. 24, 2013

Related U.S. Application Data

(60) Provisional application No. 61/508,727, filed on Jul. 18, 2011.

(51) Int. Cl.
*H04M 1/00* (2006.01)
*H04B 1/38* (2006.01)

(52) U.S. Cl.
USPC .......................... 455/558; 455/418; 709/215

(58) Field of Classification Search
USPC .......................... 455/411, 418, 558; 709/215
See application file for complete search history.

(56) References Cited

U.S. PATENT DOCUMENTS

| | | | |
|---|---|---|---|
| 7,444,410 B1* | 10/2008 | Hichwa et al. ................. | 709/228 |
| 7,606,580 B2* | 10/2009 | Granito et al. ............. | 455/456.1 |
| 8,359,016 B2* | 1/2013 | Lindeman et al. ......... | 455/414.1 |
| 2002/0090934 A1* | 7/2002 | Mitchelmore ................ | 455/412 |
| 2004/0059776 A1* | 3/2004 | Pitzel et al. .................. | 709/203 |
| 2007/0184858 A1 | 8/2007 | Landschaft et al. .......... | 455/466 |
| 2009/0291712 A1 | 11/2009 | Park et al. ..................... | 455/558 |
| 2011/0028135 A1 | 2/2011 | Srinivasan .................... | 455/415 |

FOREIGN PATENT DOCUMENTS

| | | |
|---|---|---|
| EP | 1 879 132 A1 | 1/2008 |
| GB | 2478971 A | 9/2011 |
| WO | WO 2006/114244 A1 | 11/2006 |
| WO | WO2009051377 A1 | 4/2009 |
| WO | WO2010027765 A2 | 3/2010 |

OTHER PUBLICATIONS

3GPP TS 31.101 V10.0.01 (Jun. 2011), 3$^{rd}$ Generation Partnership Project: Technical Specification Group Core Network and Terminals; UICC—terminal Interface; Physical and Logical Characteristics (Release 10).

3GPP TS 31.102 V10.2.0 (Jun. 2011), 3$^{rd}$ Generation Partnership Project: Technical Specification Group Core Network and Terminals; Characteristics of the Universal Subscriber Identity Module (USIM) Application (Release 10).

(Continued)

*Primary Examiner* — Nhan Le

(74) *Attorney, Agent, or Firm* — Harrington & Smith

(57) ABSTRACT

A method includes downloading at the request of a user an application for storage in a secure module of a terminal; requesting the user to assign a descriptive name for the downloaded application; storing the descriptive name together with an application identity of the downloaded application; in response to a request to activate a stored application, presenting the user with a list having elements of one or more stored applications, where each list element comprises at least the user assigned descriptive name; and activating an application associated with a selection of a list element by the user. Various embodiments of apparatus for implementing the method are also disclosed.

32 Claims, 3 Drawing Sheets

(56) References Cited

OTHER PUBLICATIONS

3GPP TS 33.220 V10.0.0 (Oct. 2010), 3rd Generation Partnership Project: Technical Specification Group Services and System Aspects; Generic Authentication Architecture (GAA); Generic Bootstrapping Architecture (GBA) (Release 10).

McLaughlin et al, "eUICC Ecosystem Credentials", ETSI TC SCP REQ #30 CASERTA, IT, May 9-11, 2011, SCPREQ(11)0059, 4 pages.

ETSI TS 102 221 V7.18.0 (Oct. 2010), Smart Cards; UICC—Terminal Interface Physical and Logi Characteristic (Release 7).

ETSI TC SCP Req ad hoc #113, London GB, Apr. 27-28, 2011, Tdoc SCPREQ (11)0043 Change Request 102 412 CR, "Addition of Requirements for the eUICC and its Remote Management".

3GPP TS 33.102 version 10.0.0 (Oct. 2010), "Generic Authentication Architecture (GAA); Generic bootstrapping architecture" (Section 4.4.8 cited in application) (75 pages).

* cited by examiner

APPLICATION SELECTION FOR MULTI-SIM ENVIRONMENT

CLAIM OF PRIORITY FROM CO-PENDING PROVISIONAL PATENT APPLICATION

This patent application claims priority under 35 U.S.C. §119(e) from Provisional Patent Application No.: 61/508,727, filed Jul. 18, 2011, the disclosure of which is incorporated by reference herein in its entirety, including all exhibits appended to Provisional Patent Application No.: 61/508,727.

TECHNICAL FIELD

The exemplary embodiments of this invention relate generally to mobile communication devices and methods and, more specifically, relate to subscriber identity modules and even more specifically to enhancements thereto such as UICC and embedded UICC (eUICC).

BACKGROUND

The following abbreviations are defined as follows:
AID application identity
CSIM CDMA subscriber identity module
EF elementary file
EFDIR elementary file directory ($EF_{DIR}$)
ETSI European Telecommunications Standards Institute
GBA generic bootstrapping architecture (e.g., 3GPP TS 33.220)
ISIM IP multimedia services identity module
MNO mobile network operator
MTM mobile trusted module
NFC near field communication
SCP smart card platform
SIM subscriber identity module
USIM universal subscriber identity module Reference can be made to 3GPP TS 31.102 VI0.2.0 (2011-06) Technical Specification 3rd Generation Partnership Project; Technical Specification Group Core Network and Terminals; Characteristics of the Universal Subscriber Identity Module (USIM) application (Release 10).

3G cards are UICC cards and store a SIM/USIM application. Previous 2G cards are referred to simply as SIM cards. A conventional UICC card or SIM card is issued by an operator and is used with one radio instance. As such, no problem is presented for the operator or some requestor to locate a needed application on the card. However, this scenario changes when there is, for example, an eUICC present in a terminal that stores applications from multiple operators and/or there are different security modules in the same terminal that hold the same application. In this case it can occur, for example, that the USIM application of a first operator and the C-SIM of a potential second operator have two different radio modules simultaneously active.

Such a scenario may also allow operators to upgrade their networks gradually, since with such a technology old and new network types could be supported simultaneously and the user would always have connectivity.

Reference can be made to, for example, 3GPP TS 33.220 V10.0.0 (2010-10) Technical Specification 3rd Generation Partnership Project; Technical Specification Group Services and System Aspects; Generic Authentication Architecture (GAA); Generic Bootstrapping Architecture (GBA) (Release 10), section 4.4.8 "Requirements on selection of UICC application and related keys" and to Annex D (informative): "Dialog example for user selection of UICC application used in GBA".

In section 4.4.8, under 1(c), it is stated that if no preference was given and there is more than one active UICC application, the GBA function may show a UICC application choosing dialogue to the end user (the list contains the "Labels" from the application list of all active UICC applications), from which the end user chooses the UICC application to be selected. If no dialogue is shown the GBA function shall select the active USIM application, if an active USIM application exists, otherwise any active ISIM application. If no preference was given and there is only one active UICC application, then the GBA function selects this active UICC application;

Under portion 1(d) it is stated that if no "Label" was indicated in step (a) and if there are no UICC applications active, or if there is no UICC application of the preferred UICC application type active:
  if there is only one UICC application on the UICC, the GBA function selects it, if possible;
  if there is more than one UICC application on the UICC, the GBA function may show a UICC application choosing dialogue to the end user (the list contains the "Labels" from the application list of the UICC), from which the end user chooses the UICC application to be selected. If a preferred UICC application type was indicated and there are UICC applications of this type on the UICC, then the list shown contains only UICC applications of this type, otherwise the list contains all UICC applications on the UICC. If no dialogue is shown the GBA function shall select the "last selected" UICC application of the preferred type (i.e. either the "last selected" USIM or the "last selected" ISIM depending on the given preference), if possible. In case the Ua application indicated "no preference" and both USIM and ISIM are present on the UICC, then the "last selected" USIM is selected.

3GPP TS 33.220, section 4.4.8, references 3GPP TS 31.101 V10.0.1 (2011-06) Technical Specification 3rd Generation Partnership Project; Technical Specification Group Core Network and Terminals; UICC-terminal interface; Physical and logical characteristics (Release 10). Section 13 of 3GPP TS 31.101 13, "Application independent files" states that there are four EFs at the Master File (MF) level specified in ETSI TS 102 221 clause 13 ($EF_{ICCID}$; $EF_{DIR}$, $EF_{PL}$ and $EF_{ARR}$), which are all mandatory for 3GPP. The $EF_{DIR}$ file contains the Application Identifiers (AIDS) and the Application Labels of the 3GPP applications present on the card as mandatory elements. The AIDs of 3GPP applications are defined in ETSI TS 101 220. The 3GPP applications can only be selected by means of the AID selection. The $EF_{DIR}$ entry is specified as not containing a path object for application selection, and it is recommended that the application label does not contain more than 32 bytes.

Reference can also be made to ETSI TC SCP REQ ad hoc #113, London, GB, 27-28 April 2011, Tdoc SCPREQ (11) 0043, Change Request 102 412 CR, Title "Addition of requirements for the eUICC and its remote management". Reference can also be made to ETSI TC SCP REQ #30, REQ (11) 0059, Caserta, IT, 09-11 May 2011, Title: "eUICC Ecosystem Credentials". Reference can also be made to the ISO/IEC 7816-4 specification that contains, in part, an $EF_{DIR}$ where a label can be placed. However, the label is not editable by the user. Reference can also be made to the use of dual SIM terminals, e.g., WO 2006/114244 and US 2007/0184858 A1.

BRIEF SUMMARY OF NON-LIMITING EXAMPLES OF THE EMBODIMENTS OF THIS INVENTION

In a first aspect thereof the exemplary embodiments of this invention provide a method that comprises downloading at the request of a user an application for storage in a secure module of a terminal; requesting the user to assign a descriptive name for the downloaded application; storing the descriptive name together with an application identity of the downloaded application; in response to a request to activate a stored application, presenting the user with a list having elements of one or more stored applications, where each list element comprises at least the user assigned descriptive name; and activating an application associated with a selection of a list element by the user.

In another non-limiting aspect thereof the exemplary embodiments of this invention provide an apparatus that comprises at least one processor and at least one memory that includes computer program code. The at least one memory and computer program code are configured, with the at least one processor, to cause the apparatus, in response to downloading an application for storage in a secure module of a terminal, to request a user to assign a descriptive name for the downloaded application; to store the user assigned descriptive name together with an application identity of the downloaded application; and, in response to a request to activate a stored application, to present the user with a list having elements of one or more stored applications, where each list element comprises at least the user assigned descriptive name, and where the at least one memory and computer program code are further configured, with the at least one processor, to activate an application associated with a selection of a list element by the user.

In yet another non-limiting aspect thereof the exemplary embodiments of this invention provide an apparatus that comprises means for downloading, at the request of a user, an application for storage in a secure module of a terminal; means for requesting the user to assign a descriptive name for the downloaded application; means for storing the descriptive name together with an application identity of the downloaded application; means, responsive to a request to activate a stored application, for presenting the user with a list having elements of one or more stored applications, where each list element comprises at least the user assigned descriptive name; and means for activating an application associated with a selection of a list element selected by the user.

BRIEF DESCRIPTION OF THE DRAWINGS:

Aspects of the embodiments of this invention are found in the following Detailed Description, when read in conjunction with the attached Drawing Figures, wherein.

DETAILED DESCRIPTION

Currently operators and applications need to interact with the USIM, C-SIM, ISIM, SIM, R-SIM in a multi-SIM or eUICC environment. This type of interaction poses a challenge. For example, a US phone might have active a USIM for use with a long term evolution (LTE) network (long term evolution network) and a C-SIM for use with a prior US network so that the phone would always have connectivity (the phone would use whichever network is currently the most optimum).

Assume that some requestor wants to use an application on a secure module in the terminal (can be an embedded UICC chip or a removable UICC or a mobile trusted module (MTM)). The requestor can be the operator who wishes to update the data in the operator's USIM application, or a web browser that wishes to make use of a GBA application in the secure module (e.g., same UICC card) for, as an example, performing a Single Sign On (S SO) procedure or a radio call set-up request. The requestor could be some other legitimate entity.

The question that arises in this case is how would the terminal then locate the correct application on the eUICC?

This problem did not arise previously as there were no multiple USIMs from different operators on the same UICC card. Further, there was typically only one SIM card per radio module and the SIM card was fully controlled by one operator (not by possibly several different entities who independently store their relevant data in the SIM). Hence there was also no risk that one operator would overwrite the subscription of another operator.

As was made evident above, traditional methods are not suitable for controlling the conventional multi-SIM/eUICC case.

The exemplary embodiments of this invention provide methods and apparatus to implement a novel control entity in a terminal that controls the handling of an incoming request for an application in an integrated circuit card such as in an eUICC or in an UICC, or both, and that identifies the correct recipient of the incoming request and provides the correct communication channel.

Figure 1:
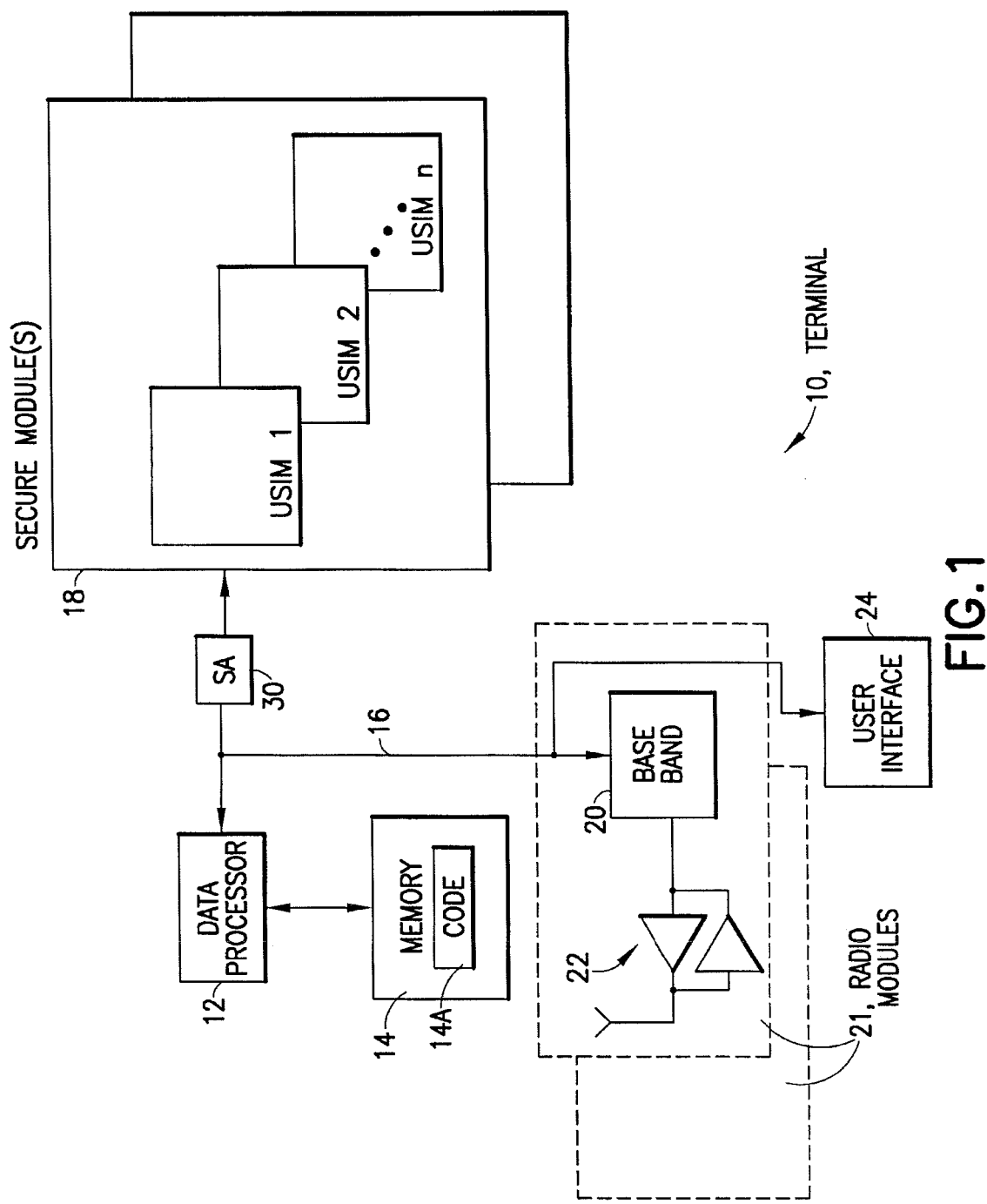
FIG. 1 is simplified block diagram of a mobile equipment (terminal) that includes multiple secure modules and a selector assistant in accordance with the exemplary embodiments of this invention.

FIG. 1 is a block diagram of a system, such as a mobile system or equipment or user equipment or, even more generally, a terminal 10 (e.g., a cellular phone, a smart phone, a tablet computer, a personal digital assistant (PDA), a laptop computer, etc.). The terminal 10 includes at least one data processor 12, at least one memory 14 (such as ROM and RAM (e.g., DRAM or DRAM in combination with SRAM and/or a disk) that stores computer program code (instructions) 14A for execution by the data processor 12, as well as data that is used/generated during execution of the program code 14A. The stored program code may be assumed in many embodiments to include an operating system (OS) and various application programs. The terminal 10 can also include at least one data/address/command bus 16 and at least one secure module 18 that stores a plurality of USIMs (USIM1, USIM2, . . . , USIMn) that is operated in accordance with the exemplary embodiments of this invention. The secure module(s) 18 can be in the form of, for example, a plug-in card (e.g., UICC, memory card), or it may be embedded in the terminal 10 (e.g., physically embedded eUICC). It should be noted that the secure module(s) 18 can be virtual and may reside together in one physical secure chip or module or integrated circuit component. The terminal 10 can also include by example other components including two or more radio modules 21 (which may preferably be capable of simultaneous operation) each including at least one wireless transceiver 20 and related baseband (BB) circuitry 22, as well as appropriate user interface components 24 such as a touch-sensitive display screen, microphone and speaker(s). As an example, the touch-sensitive display screen can emulate the operation of a keyboard enabling the user to enter alphanumeric information, as well as to activate various soft command/control buttons. Other components (not shown), including one or more digital cameras, can also be present depending on the specific construction of the terminal 10. The terminal 10 or other type of mobile device may be embodied as a mobile phone, a tablet, a laptop with cellular capability or any other machine that has cellular communication capability (e.g. Internet machines and/or devices capable of machine-to-machine communication).

The radio modules 21 can be adapted and configured for operation with any desired type of wireless radio communications including $3^{rd}$ generation (3G) technologies such as GSM and $4^{th}$ generation (4G) technologies such as long term evolution (LTE). In some embodiments one or more of the radio modules could be configured to operate with a shorter range (local) wireless technology such as one using a WiFi technology or a near field communication (NFC) technology. In other words, the examples of the embodiments of this invention are not limited for use with any one particular type or types of wireless communication techniques and apparatus.

Figure 2:
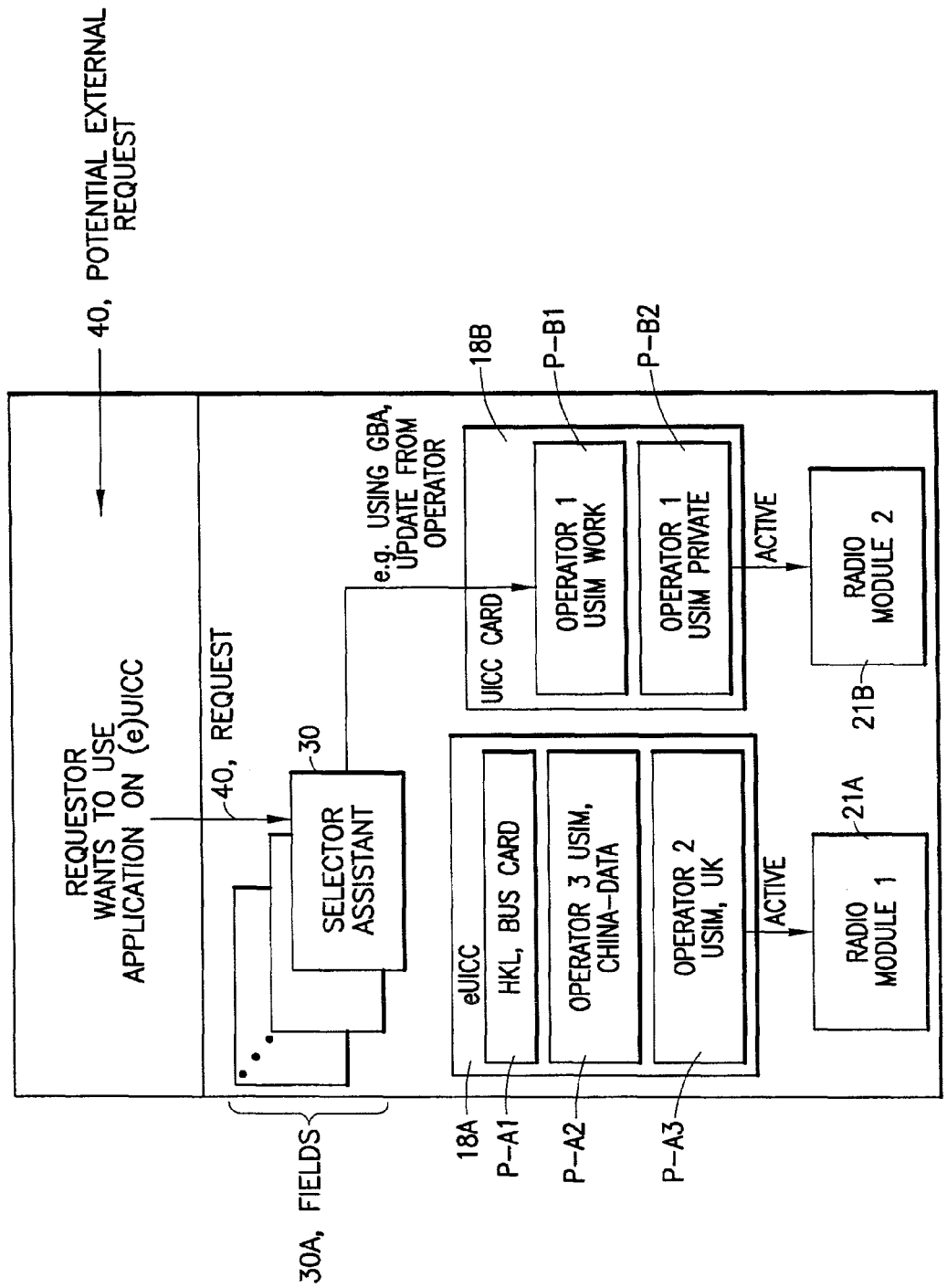
FIG. 2 is a block diagram depicting the selector assistant connectable with, for example, an eUICC module and an UICC module contained in the terminal shown in FIG. 1.

In accordance with an aspect of this invention the terminal 10 also includes a functional module (hardware or software or a combination of hardware and software) referred to herein as a selector assistant (SA) 30, which is shown also in FIG. 2 to be (logically) interposed between the data processor 12 and the secure module(s) 18. The selector assistant 30 can be part of the operating system (OS) of the terminal 10, or it could be embodied in a baseband chip (e.g., in one of the radio modules 21 if more than one are present). The selector assistant 30 is described in greater detail below.

The various components depicted in FIG. 1 can be implemented as discrete packages. Alternatively one or more, or all, of these components can be integrated into a single package (integrated circuit), such as in a system-on-a-chip (SOC) type of package.

Referring to FIG. 2 there is shown as non-limiting examples several secure modules 18, specifically an eUICC 18A and a UICC card 18B each associated with a radio module 21 A and 21 B, respectively. The eUICC 18A and the UICC card 18B each contain what may be referred to as 'profiles'. The eUICC 18A contains as an example three profiles (P-A1, P-A2, PA-3), while the UICC card 18B contains two profiles (P-B1, P-B2). The various descriptive labels attached to these profiles (e.g., 'Operator1 USIM Work' of P-B1 and 'Operator2 USIM, UK' of P-A3) are merely exemplary. The various operators can be considered, for example, as being MNOs.

In current practice only one telecommunication profile is assumed to be active. Any selection 'logic' is that the active telecommunication profile is the one where the communication should be directed, i.e., there is no selection logic per se.

The selector assistant 30 shown in FIGS. 1 and 2 does not depend on the actual application that is sending the request (the requestor), i.e., it is an application independent unit. As was noted above in some embodiments the selector assistant 30 may be considered to form a part of the terminal operating system (OS), which differs from the UICC selection scenario described in 3GPP TS 33.220, Section 4.4.8.

As can be seen in FIG. 2, the exemplary embodiment of this invention assumes the use of profiles owned by different parties (i.e., one operator does not own them all).

The eUICC 18A may contain an entry in the $EF_{DIR}$ for the profile. This entry is owned by the profile owner (operator, public transport company, etc.) and is conventionally considered as not being user editable.

An aspect of the exemplary embodiments provides an ability to assign an application-independent user-editable field that is part of the new application-independent selector assistant 30 functionality. This field is stored in the selector assistant together with a copy of the $EF_{DIR}$ entry. As was discussed above, 3GPP TS 33.220, Section 4.4.8, contains a label that is bound to the actual requesting application and to the applications available in the terminal (i.e., GBA). This previous approach would not be operable for use with the multiple secure modules 18A, 18B or multiple USIM applications.

A descriptive name that is stored in the user-editable field (several such fields 30A are shown in FIG. 2) bound to the $EF_{DIR}$ is assigned by the user during, e.g., a download operation (e.g., using the user interface 24). For example, the user downloads from an Operator web page a USIM for China for a next business trip to be made by the user. In this case the user may wish to assign the name to this downloaded application as "China-data", as shown in P-A2. If the profile owner (the Operator3 in the example shown in FIG. 2) supports this feature during the download an entry in the $EF_{DIR}$ is created and a copy of the $EF_{DIR}$ is placed in the selector assistant 30 together with the user-assigned name (e.g., "China-data") that is recorded in the associated field 30A. The owner of the profile can also be stored in the selector assistant 30.

The $EF_{DIR}$ contains the application identity (AID) that is different for each MNO's applications.

Assume now that a request 40 is generated for an application. The request can be generated by the user of the terminal 10. The request 40 is sent to the selector assistant 30. The selector assistant 30 can respond in various ways to the receipt of the request 40.

In one embodiment the selector assistant 30 can use a hint given by the requestor (e.g., the owner of application, AID) in the request 40. As an example, the hint may be "China", or "data". If there are several matches then the user can be presented with a list of the choices (e.g., using the user interface 24) that the selector assistant 30 has stored. It is assumed that there can be only one AID that matches per card (secure module 18), i.e., the AID is preferably unique on the card. The user can then indicate which of the displayed choices should be selected.

In another embodiment no hint is present in the request 40, instead only an application, such as a USIM, is specified. In this case the selector assistant 30 can display to the user a list of names of the application owners and the associated user-defined names and request the user to make a selection. This is possible as the user can perform the selection by use of a partial AID where only, e.g., the USIM application code is specified. The user then can specify which USIM application is to be selected, e.g., first, last, etc. If the selection is successful then the process always results in the selection of one specific application.

In another embodiment a trial and error approach can be used, such as by beginning the selection process by displaying a most recently active application and recording success or failure of the presented choice.

In another embodiment the selector application 30 can simply ask the user which application to select, such as by displaying a prioritized list (e.g., the most recently activated five profiles).

The selector assistant 30 preferably keeps a record of the user's behavior and choices to enable the display of optimized choices in response to another request 40.

In general, the exemplary embodiments apply to eUICC and to removable UICC and to combinations of these as shown in FIG. 2.

It can be noted that applications may or may not be associated with different radio modules 21. That is, in some embodiments a particular application may have an associated radio module different from a radio module associated with another application, while in other embodiments two or more applications may share the same radio module. A particular radio module may permit access to only one wireless network. A particular radio module may instead permit simultaneous access to two or more wireless networks, and this radio module may potentially be shared by two or more applications.

Figure 3:
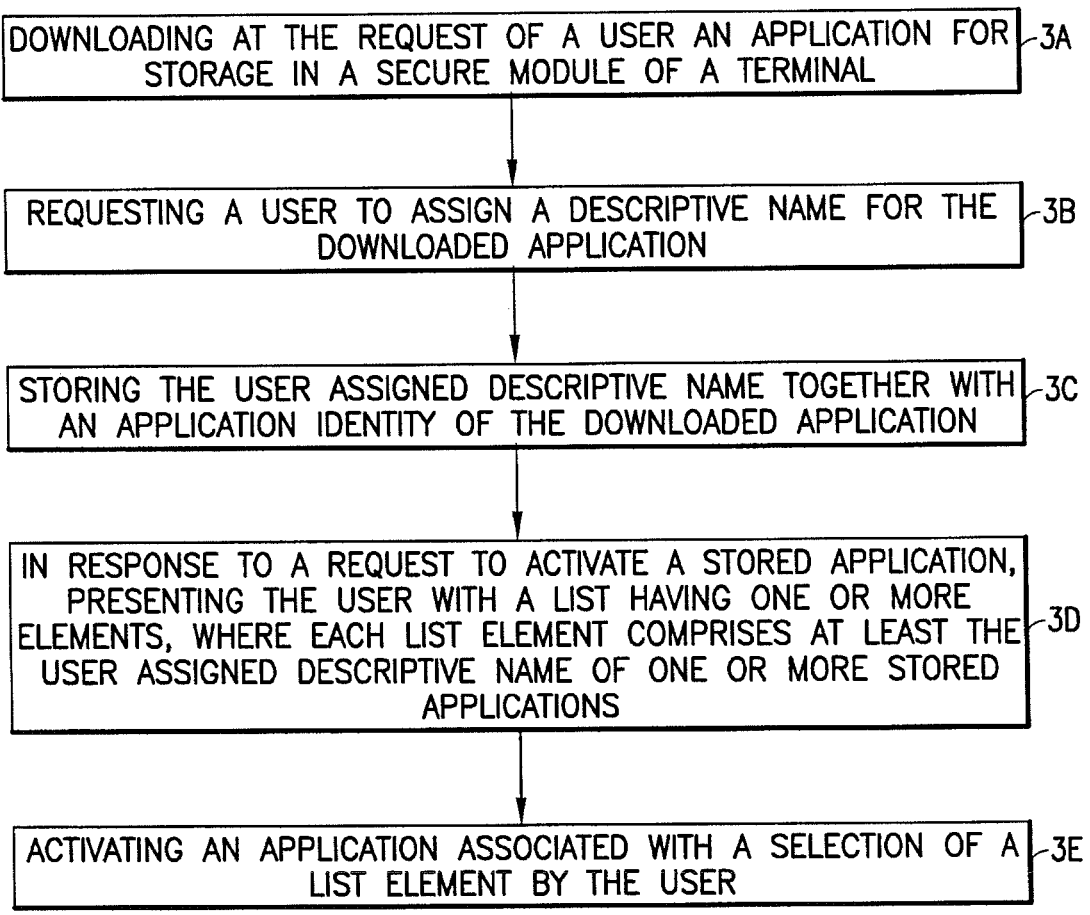
FIG. 3 is a logic flow diagram that illustrates the operation of a method, and a result of execution of computer program instructions embodied on a computer readable medium, in accordance with the exemplary embodiments of this invention.

Reference is now made to FIG. 3. In FIG. 3 the following steps are executed. At Block 3A there is a step of downloading at the request of a user an application for storage in a secure module of a terminal. At Block 3B there is a step of requesting a user to assign a descriptive name (e.g., a character string) for the downloaded application. At Block 3C there is a step of storing the user assigned descriptive name together with an application identity of the downloaded application. At Block 3D, and in response to a request to activate a stored application, presenting the user with a list having elements of one or more stored applications, where each list element comprises at least the user assigned descriptive name. At Block 3E there is as step of activating an application associated with a selection of a list element by the user.

The method as in FIG. 3 where the secure module is comprised of an embedded UICC or a UICC card that stores at least one USIM or SIM or C-SIM application.

The method as in FIG. 3, where the step of storing the user assigned descriptive name together with the application identity stores this information in an elementary file directory associated with the downloaded application.

The method as in the preceding paragraph, where the elementary file is stored for access by a selector assistant functionality of the terminal, where the selector assistant functionality is logically interposed between a source of requests and the secure module.

The method as in the preceding paragraph, where the selector assistant functionality is embodied as part of an operating system of the terminal, or is embodied as part of a baseband unit of a radio module of the terminal.

The method as in FIG. 3, where the request includes a hint as to which application is requested.

The method as in FIG. 3, where the list presented to the user comprises one or more most recently activated applications.

The method as in FIG. 3, where the list is comprised of application owner names and associated user defined descriptive names.

The method as in FIG. 3, where there can be a plurality of simultaneously active applications each associated with a radio module of the terminal.

The invention also encompasses a non-transitory computer-readable medium that contains software program instructions, where execution of the software program instructions by at least one data processor results in performance of operations that comprise execution of the method of FIG. 3 and the several paragraphs descriptive of FIG. 3.

The invention also encompasses an apparatus that comprises at least one processor and at least one memory that includes computer program code. The at least one memory and computer program code are configured, with the at least one processor, to cause the apparatus, in response to downloading an application for storage in a secure module of a terminal, to request a user to assign a descriptive name (e.g., a character string) for the downloaded application; to store the user assigned descriptive name together with an application identity of the downloaded application; and, in response to a request to activate a stored application, to present the user with a list having elements of one or more stored applications. Each list element comprises at least the user assigned descriptive name. The at least one memory and computer program code are further configured, with the at least one processor, to activate an application associated with a selection of a list element by the user.

The apparatus as in the preceding paragraph, where the secure module is comprised of an embedded UICC or a UICC card that stores at least one USIM or SIM or C-SIM application.

The apparatus as in the preceding paragraphs, where storing the user assigned descriptive name together with the application identity stores this information in an elementary file directory associated with the downloaded application.

The apparatus as in the preceding paragraph, where the elementary file is stored for access by a selector assistant that comprises a part of the terminal, where the selector assistant is logically interposed between a source of requests and the secure module.

The apparatus as in the preceding paragraph, where the selector assistant is embodied as part of an operating system of the terminal, or is embodied as part of a baseband unit of a radio module of the terminal.

The apparatus as in the preceding paragraphs, where the request includes a hint as to which application is requested, or where the list presented to the user comprises one or more most recently activated applications The apparatus as in the preceding paragraphs, where the list is comprised of application owner names and associated user defined descriptive names.

The apparatus as in the preceding paragraphs, where there can be a plurality of simultaneously active applications each associated with a different radio module of the terminal.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent methods and method steps may be attempted by those skilled in the art. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A method comprising:
   downloading at the request of a user an application for storage in a secure module of a terminal;
   requesting the user to assign a descriptive name for the downloaded application;
   storing the descriptive name together with an application identity of the downloaded application;
   in response to a request to activate a stored application, presenting the user with a list having elements of one or more stored applications, where each list element comprises at least the user assigned descriptive name; and
   activating an application associated with a selection of a list element by the user.

2. The method as in claim 1, where the secure module is comprised of an embedded UICC or a UICC that stores at least one universal subscriber identity module or subscriber identity module or a code division multiple access subscriber identity module application.

3. The method as in claim 1, where the step of storing descriptive name together with the application identity stores this information in an elementary file directory associated with the downloaded application.

4. The method as in claim 3, where the elementary file is stored for access by a selector assistant functionality of the terminal, where the selector assistant functionality is logically interposed between a source of requests and the secure module.

5. The method as in claim 4, where the selector assistant functionality is embodied as part of an operating system of the terminal.

6. The method as in claim 4, where the selector assistant functionality is embodied as part of a baseband unit of a radio module of the terminal.

7. The method as in claim 1, where the request includes a hint as to which application is requested.

8. The method as in claim 1, where the list presented to the user comprises one or more most recently activated applications.

9. The method as in claim 1, where the list is comprised of application owner names and associated user defined descriptive names.

10. The method as in claim 1, comprising a plurality of simultaneously active applications each associated with a radio module of the terminal.

11. A non-transitory computer-readable medium that contains software program instructions, where execution of the software program instructions by at least one data processor results in performance of operations that comprise execution of the method of claim 1.

12. An apparatus comprising:
    at least one processor and at least one memory that includes computer program code, the at least one memory and computer program code are configured, with the at least one processor, to cause the apparatus, in response to downloading an application for storage in a secure module of a terminal, to request a user to assign a descriptive name for the downloaded application; to store the user assigned descriptive name together with an application identity of the downloaded application; and, in response to a request to activate a stored application, to present the user with a list having elements of one or more stored applications, where each list element comprises at least the user assigned descriptive name, and where the at least one memory and computer program code are further configured, with the at least one processor, to activate an application associated with a selection of a list element by the user.

13. The apparatus as in claim 12, where the secure module is comprised of an embedded UICC or a UICC that stores at least one universal subscriber identity module or subscriber identity module or a code division multiple access subscriber identity module application.

14. The apparatus as in claim 12, where the at least one memory and computer program code are configured, with the at least one processor, to store a descriptive name together with the application identity in an elementary file directory associated with the downloaded application.

15. The apparatus as in claim 14, where the elementary file is stored for access by a selector assistant functionality of the terminal, where the selector assistant functionality is logically interposed between a source of requests and the secure module.

16. The apparatus as in claim 15, where the selector assistant functionality is embodied as part of an operating system of the terminal.

17. The apparatus as in claim 15, where the selector assistant functionality is embodied as part of a baseband unit of a radio module of the terminal.

18. The apparatus as in claim 12, where the request includes a hint as to which application is requested.

19. The apparatus as in claim 12, where the list presented to the user comprises one or more most recently activated applications.

20. The apparatus as in claim 12, where the list is comprised of application owner names and associated user defined descriptive names.

21. The apparatus as in claim 12, comprising a plurality of simultaneously active applications each associated with a radio module of the terminal.

22. An apparatus, comprising:
    means for downloading, at the request of a user, an application for storage in a secure module of a terminal;
    means for requesting the user to assign a descriptive name for the downloaded application;
    means for storing the descriptive name together with an application identity of the downloaded application;
    means, responsive to a request to activate a stored application, for presenting the user with a list having elements of one or more stored applications, where each list element comprises at least the user assigned descriptive name; and
    means for activating an application associated with a selection of a list element selected by the user.

23. The apparatus as in claim 22, where the secure module is comprised of an embedded UICC or a UICC that stores at least one universal subscriber identity module or subscriber identity module or code division multiple access subscriber identity module application.

24. The apparatus as in claim 22, where said means for storing the descriptive name together with the application identity stores this information in an elementary file directory associated with the downloaded application.

25. The apparatus as in claim 24, where the elementary file is stored for access by a means for selecting of the terminal, where the means for selecting is logically interposed between a source of requests and the secure module.

26. The apparatus as in claim 25, where said means for selecting is embodied as part of an operating system of the terminal.

27. The apparatus as in claim 25, where said means for selecting is embodied as part of a baseband unit of a radio module of the terminal.

28. The apparatus as in claim 22, where the request includes a hint as to which application is requested.

29. The apparatus as in claim 22, where the list presented to the user comprises one or more most recently activated applications.

30. The apparatus as in claim 22, where the list is comprised of application owner names and associated user defined descriptive names.

31. The apparatus as in claim 22, comprising a plurality of simultaneously active applications each associated with a radio module of the terminal.

32. The apparatus as in claim 22, where at least some of said means are embodied as a non-transitory computer-readable medium that contains software program instructions and at least one data processor connected with said non-transitory computer-readable medium and configured to execute said software program instructions.

* * * * *